United States Patent
Yang et al.

(10) Patent No.: US 6,839,247 B1
(45) Date of Patent: Jan. 4, 2005

(54) PFC-PWM CONTROLLER HAVING A POWER SAVING MEANS

(75) Inventors: Ta-yung Yang, Milpitas, CA (US); Jenn-yu G. Lin, Taipei (TW); Chern-Lin Chen, Taipei (TW)

(73) Assignee: System General Corp., Taipei Hsien (TW)

( * ) Notice: Subject to any disclaimer, the term of this patent is extended or adjusted under 35 U.S.C. 154(b) by 20 days.

(21) Appl. No.: 10/617,516

(22) Filed: Jul. 10, 2003

(51) Int. Cl.[7] .............................................. H02M 3/335
(52) U.S. Cl. .................... 363/21.11; 363/97; 363/21.07
(58) Field of Search ............................ 363/21.11, 21.07, 363/21.05, 95, 97, 49

(56) References Cited

U.S. PATENT DOCUMENTS

| | | | |
|---|---|---|---|
| 5,982,642 A | * 11/1999 | Herfurth | 363/21.08 |
| 6,172,885 B1 | * 1/2001 | Feldtkeller | 363/21.1 |
| 6,344,986 B1 | * 2/2002 | Jain et al. | 363/89 |
| 6,717,827 B2 | * 4/2004 | Ota | 363/21.12 |
| 6,768,655 B1 | * 7/2004 | Yang et al. | 363/21.01 |

* cited by examiner

Primary Examiner—Shawn Riley
(74) Attorney, Agent, or Firm—J.C. Patents (57) ABSTRACT

A PFC-PWM controller with a power saving means is disclosed. A built-in current synthesizer generates a bias current in response to feedback voltages sampled from the PWM circuit and the PFC circuit. The bias current modulates the oscillation frequency to further reduce the switching frequencies of the PWM signal and the PFC signal under light-load and zero-load conditions. Thus, power consumption is greatly reduced. The PFC and the PWM switching signals interleave each other, so that power can be transferred more smoothly from the PFC circuit to the PWM circuit. The saturation of the switching components can be avoided by limiting the maximum on-time of the PWM signal. Further, an external resistor is used to start up the PFC-PWM controller and provide an AC template signal for PFC control.

12 Claims, 9 Drawing Sheets

PFC-PWM CONTROLLER HAVING A POWER SAVING MEANS

BACKGROUND OF THE INVENTION

1. Field of the Invention

The present invention generally relates to a forward switching mode power converter. More particularly, the present invention relates to a PFC-PWM controller having a power saving means. The present invention teaches a forward power converter with power factor correction in the front end.

2. Description of the Related Art

Switching-mode power converters have been widely used in many electronic appliances over the last few decades. Switching-mode power converters have several advantages over linear power converters, including higher power conversion efficiency, lighter weight, and smaller size.

However, traditional switching-mode power supplies have some drawbacks. A typical switching mode power converter conducts a non-sinusoidal line current in short pulses that are in phase with the line voltage. This is undesirable for a switching-mode power supply, because it reduces the power factor. Ideally, a switching mode power converter should have a power factor close to 1, but non-sinusoidal line current conduction reduces this to approximately 0.6. For applications that consume 70 watts or more, this could be a serious source of power loss.

Another drawback of switching mode power converters is that line harmonics are produced whenever the line current is not sinusoidal. The harmonic currents do not contribute to the load power, but they do cause excess heat generation in the power contribution system.

To avoid unnecessary power losses and heat dissipation, some prior-art switching-mode power converters include power-factor correction circuitry. Power-factor correction is applied to the line current to create a sinusoidal input current waveform that is in phase with the line voltage.

One drawback of traditional power factor correction schemes is that they do not reduce power consumption sufficiently to comply with recent environmental regulations. In recent years, many countries have adopted strict regulations regarding power consumption. Electronic devices that consume 70 watts or more are generally required to minimize power consumption during standby, or idle-mode. However, traditional switching-mode power supplies with power factor correction still operate at a specific PWM switching frequency during standby. Since the power consumption of a switching-mode power converter is directly proportional to the switching frequency of the PWM signal and the PFC signal, prior-art switching-mode power supplies fail to minimize power consumption during standby.

Recently enacted environmental regulations regarding standby mode power consumption have created a need in many countries for more efficient power supplies. A switching-mode power supply having power factor correction and a switching frequency reducing means under light-load and zero-load conditions is needed.

SUMMARY OF THE INVENTION

A principal objective of the present invention is to provide a PFC-PWM controller having a power saving means.

Another objective of the present invention is to synchronize the PWM signal and the PFC signal in an interleaved manner so that a smoother energy delivery from the PFC circuit to the PWM circuit can be effectively achieved and as well increasing power transmission efficiency. The PFC-PWM controller according to the present invention uses a pulse signal to accomplish this objective.

Another objective of the present invention is to provide a pulse-width limiter to establish a maximum on-time for the PWM signal so that switching components such as the transformer and the transistor can be effectively prevented from being saturated.

Still another objective of the present invention is to eliminate the pin-count of the PFC-PWM controller.

According to one aspect of the present invention, the PFC-PWM controller includes a current synthesizer that generates a bias current in response to a PFC-feedback voltage and a PWM-feedback voltage. The bias current will modulate an oscillator frequency to vary the switching frequency of the PFC signal and the PWM signal. When the power converter operates under light-load conditions, the bias current will be reduced to increase the switching period. This feature can dramatically reduce the power consumption of the PFC-PWM controller.

According to another aspect of the present invention, the PFC-PWM controller is started up using an external resistor and once the PFC-PWM controller is in operation, the external resistor provides an AC current reference. The AC current reference is supplied to a multiplier/divider circuit and an error amplifier circuit to improve PFC control.

It is to be understood that both the foregoing general descriptions and the following detailed descriptions are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
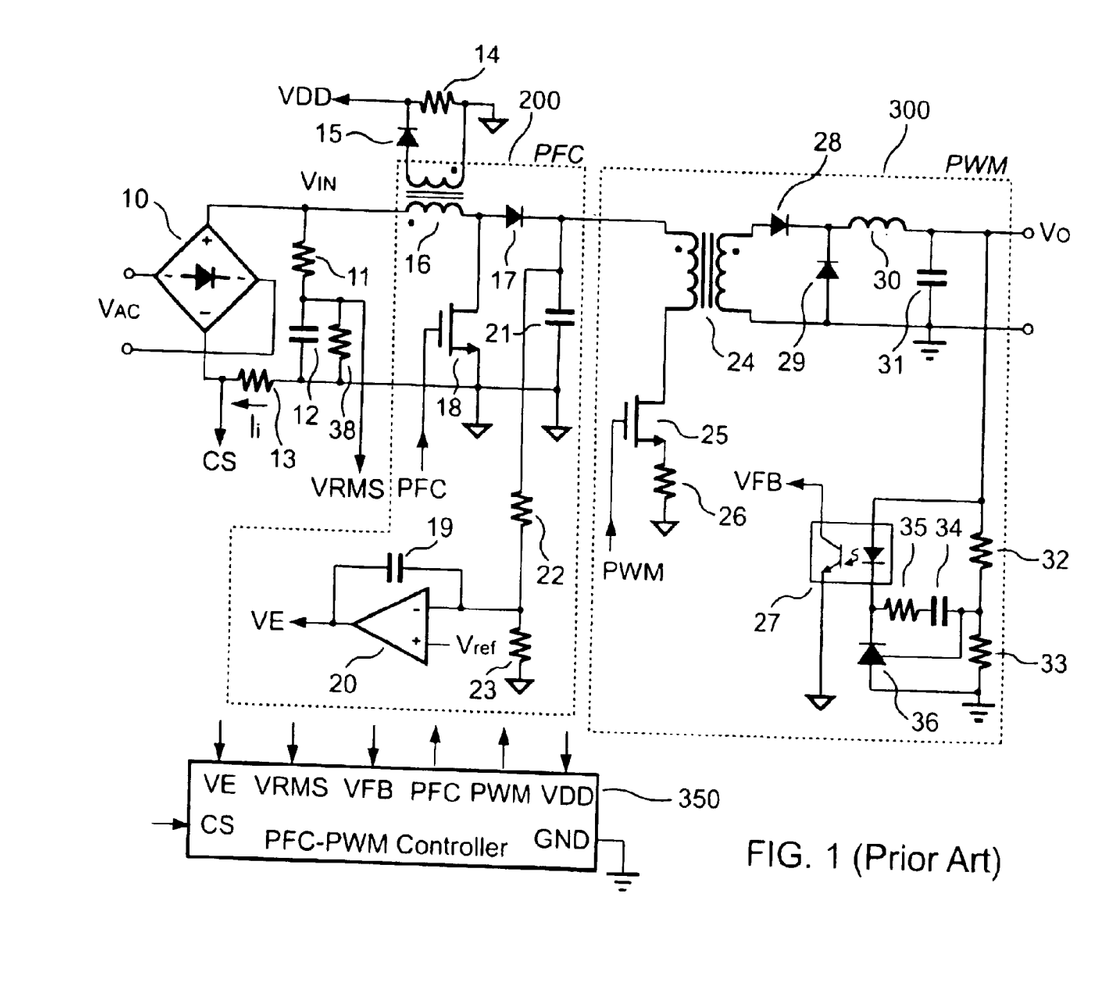
FIG. 1 shows a prior-art schematic diagram of a forward power converter with a PFC-PWM controller.

FIG. 1 shows a conventional forward power converter equipped with a PFC-PWM controller 350 to drive a PFC circuit 200 and a PWM circuit 300. A resistor 22 and a resistor 23 form a resistor divider to sense the output voltage of the PFC circuit 200 from a cathode of a rectifying diode 17. An operational amplifier 20 generates a PFC-feedback voltage $V_E$ that is varied in inverse proportion to the voltage at the junction of the resistors 22 and 23. The PWM circuit 300 can be viewed as the load of the PFC circuit 200. An increased load will cause the output voltage of the PWM circuit 300 to decrease, and with that the output voltages of the PFC circuit 200 and the PWM circuit 300 will also decrease accordingly. On the other hand, when the load decreases, the output voltages of the PFC circuit 200 and PWM circuit 300 will also increase. To obtain a sinusoidal line current waveform, the PFC-PWM controller 350 accepts several input signals. The input signals include the line current information, the PFC-feedback voltage V., the root-mean square value of the line voltage, and a current-detect voltage $V_{CS}$. The line current information is taken from a positive output of a rectifying bridge diode 10. The root-mean square value of the line voltage is taken from the junction of a resistor 11 and a resistor 38. The current-detect voltage $V_{CS}$ is taken from a current-detect resistor 13. The PFC-PWM controller 350 enables energy from the PFC circuit 200 to be delivered smoothly to the PWM circuit 300.

However, the prior-art power converters operate in a lower and fixed switching frequency under light load condition. Since power consumption is proportional to the switching frequency, this fixed switching frequency still cause unavoidable power consumption. Therefore, in order to save more energy under standby mode, a means for power saving is needed.

Figure 3:
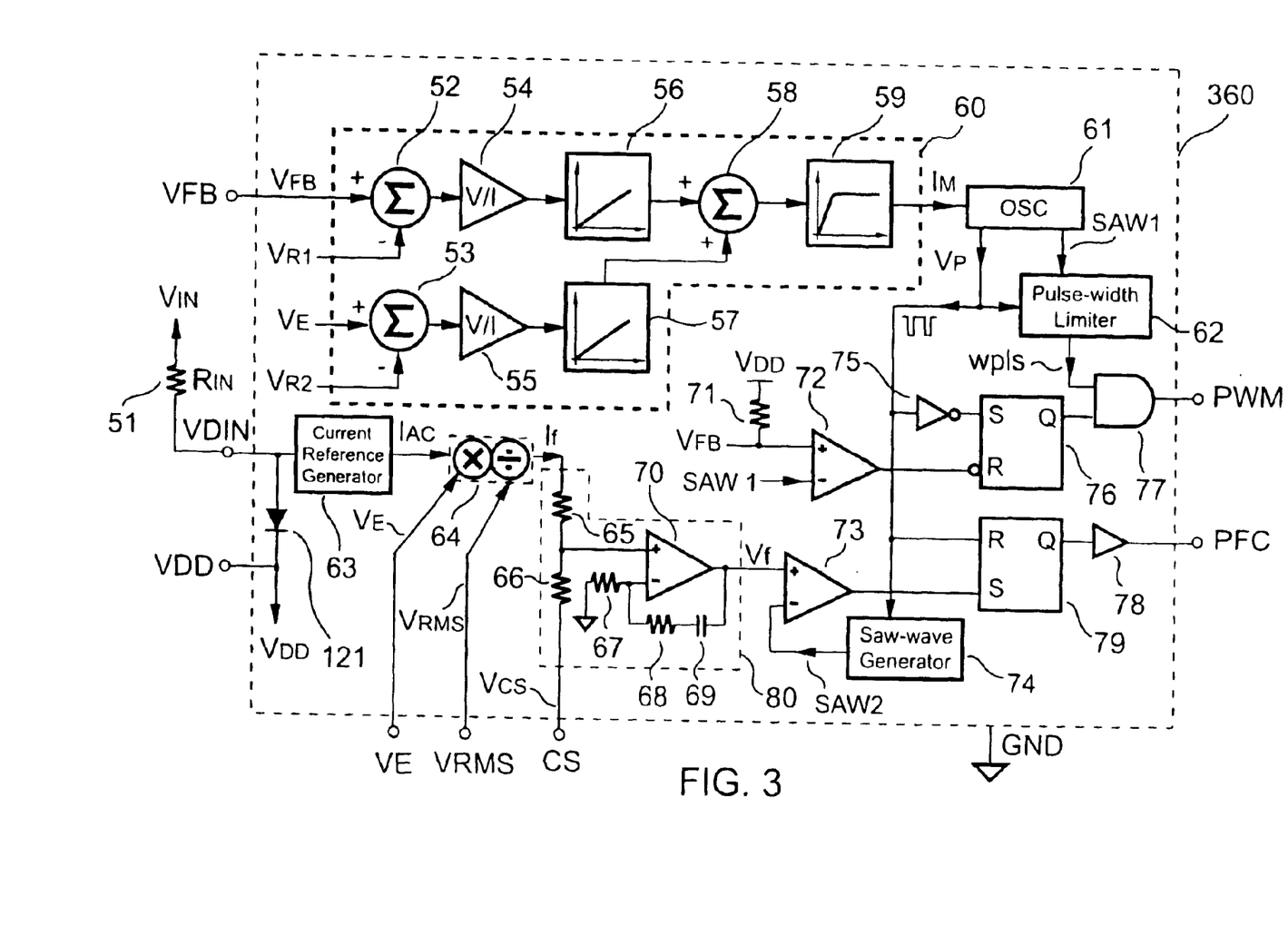
FIG. 3 illustrates one embodiment of the PFC-PWM controller according to the present invention.

FIG. 3 shows a schematic circuit diagram of a forward power converter according to the present invention. The forward power converter according to the present invention can reduce power consumption under light-load and no load conditions. Further referring to FIG. 3, the PFC-PWM controller 360 comprises a current synthesizer 60, an oscillator 61, a pulse-width limiter 62, an AND-gate 77, a buffer-gate 78, a SR flip-flop 76, a SR flip-flop 79, a NOT-gate 75, a saw-wave generator 74, a comparator 72, a comparator 73, an error amplifier circuit 80, a resistor 71, a multiplier/divider circuit 64, a current reference generator 63, and a diode 121.

Referring to FIG. 3, the current synthesizer 60 comprises an adder 52, an adder 53, an adder 58, a V-to-I converter 54, a V-to-I converter 55, a current mirror 56, a current mirror 57, and a current limiter 59. A positive input of the adder 52 is supplied by a PWM-feedback voltage $V_{FB}$, which is derived from an output terminal of an opto-coupler 27 shown in FIG. 2. A positive input of the adder 53 is supplied by a PFC-feedback voltage $V_E$, which is derived from an output of an operational amplifier 20 shown in FIG. 2.

A negative input of the adder 52 is supplied by a reference voltage $V_{R1}$. A negative input of the adder 53 is supplied by a reference voltage $V_{R2}$. An output of the adder 52 is connected to an input of the V-to-I converter 54. The magnitude of the output signal of the adder 52 is equal to the reference voltage $V_{RI}$ subtracted from the PWM-feedback voltage $V_{FB}$. An output of the adder 53 is connected to an input of the V-to-I converter 55. The magnitude of the output signal of the adder 53 is equal to the reference voltage $V_{R2}$ subtracted from the PFC-feedback voltage $V_E$. An output of the V-to-I converter 54 is connected to a first input of the adder 58 via the current mirror 56. An output of the V-to-I converter 55 is connected to a second input of the adder 58 via the current mirror 57. The current synthesizer 60 outputs a bias current $I_M$ from an output of the adder 58 via the current limiter 59.

The bias current $I_M$ is supplied to an input of the oscillator 61. By modulating the bias current $I_M$, the frequency of the oscillator 61 can be varied to control the switching frequency of the PWM signal and the PFC signal. A first output of the oscillator 61 generates a pulse signal $V_P$, which is supplied to a first input of the pulse-width limiter 62, an input of the NOT-gate 75, a reset-input of the SR flip-flop 79 and an input of the saw-wave generator 74. A second output of the oscillator 61 outputs a first saw-tooth signal SAW1, which is supplied to a second input of the pulse-width limiter 62. A set-input of the SR flip-flop 76 is connected to an output of the NOT-gate 75. An output of the pulse-width limiter 62 outputs the limit signal wpls, which is supplied to a first input of the AND-gate 77. A second input of the AND-gate 77 is connected to an output of the SR flip-flop 76. The AND-gate 77 outputs the PWM signal for switching the PWM circuit 300 shown in FIG. 2. The resistor 71 is connected between a supply voltage terminal $V_{DD}$ and a positive input of the comparator 72. The resistor 71 is used to bias the opto-coupler 27 shown in FIG. 2. The positive input and a negative input of the comparator 72 are further connected to the output of the opto-coupler 27 and the second output of the oscillator 61 respectively. An output of the comparator 72 is connected to a reset-input of the SR flip-flop 76.

Figure 2:
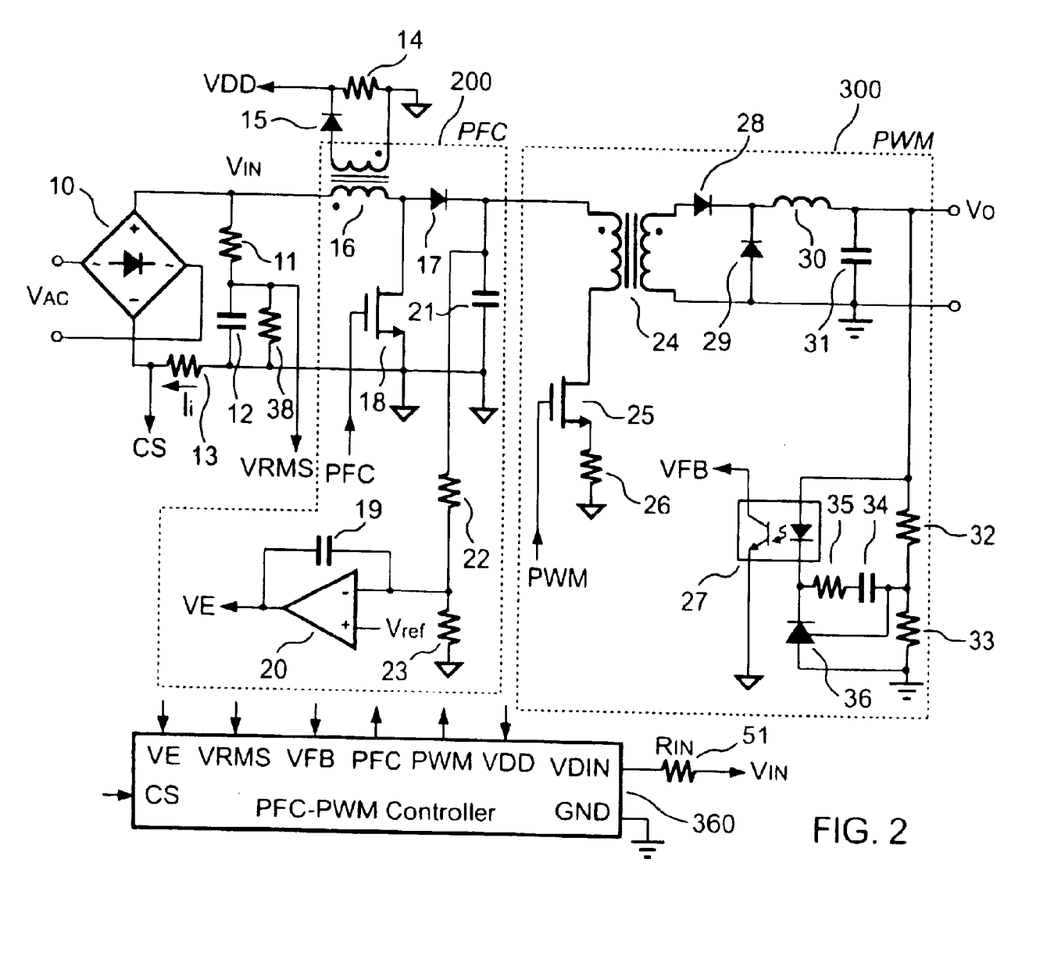
FIG. 2 shows a schematic diagram of a forward power converter with a PFC-PWM controller according to the present invention.

An input resistor 51 is connected between an input voltage terminal $V_{IN}$ and an input of the current reference generator 63. An anode of the diode 121 is connected to the input of the current reference generator 63. A cathode of the diode 121 supplies the supply voltage $V_{DD}$ from the auxiliary winding of a PFC transformer 16 via a rectifying diode 15. The PFC transformer 16 and the rectifying diode 15 are shown in FIG. 2. An output of the current reference generator 63 supplies an AC template signal $I_{AC}$ to a first input of the multiplier/divider circuit 64. A second input of the multiplier/divider circuit 64 is supplied by the PFC-feedback voltage $V_E$. A third input of the multiplier/divider circuit 64 is supplied by an input voltage with root-mean-square value $V_{RMS}$. The feedback current $I_f$ generated by the multiplier/divider circuit 64 can be expressed by following equation:

$$I_f = \frac{I_{AC} \times V_E}{V_{RMS}^2} \tag{1}$$

A resistor 65, a resistor 66, a resistor 67, an operational amplifier 70, a resistor 68, and a capacitor 69 form the error amplifier circuit 80. The feedback current $I_t$ is supplied to a first input of the error amplifier circuit 80. The current-detect voltage $V_{CS}$ is supplied to a second input of the error amplifier circuit 80. FIG. 2 shows a bridge rectifier 10 and a resistor 13. The resistor 13 is connected between a negative output of the bridge rectifier 10 and the ground reference. The input current $I_1$ will generate the current-detect voltage $V_{CS}$ across the resistor 13.

The error amplifier circuit 80 will generate a feedback voltage $V_f$ in response to the feedback current I, and the current-detect voltage $V_{CS}$. A positive input of the comparator 73 is supplied by the feedback voltage $V_f$. A negative input of the comparator 73 is connected to an output of the saw-wave generator 74. The SR flip-flop 79 is set by an output of the comparator 73. The SR flip-flop 79 outputs the PFC signal via the buffer-gate 78 to drive the PFC circuit 200.

Figure 4:
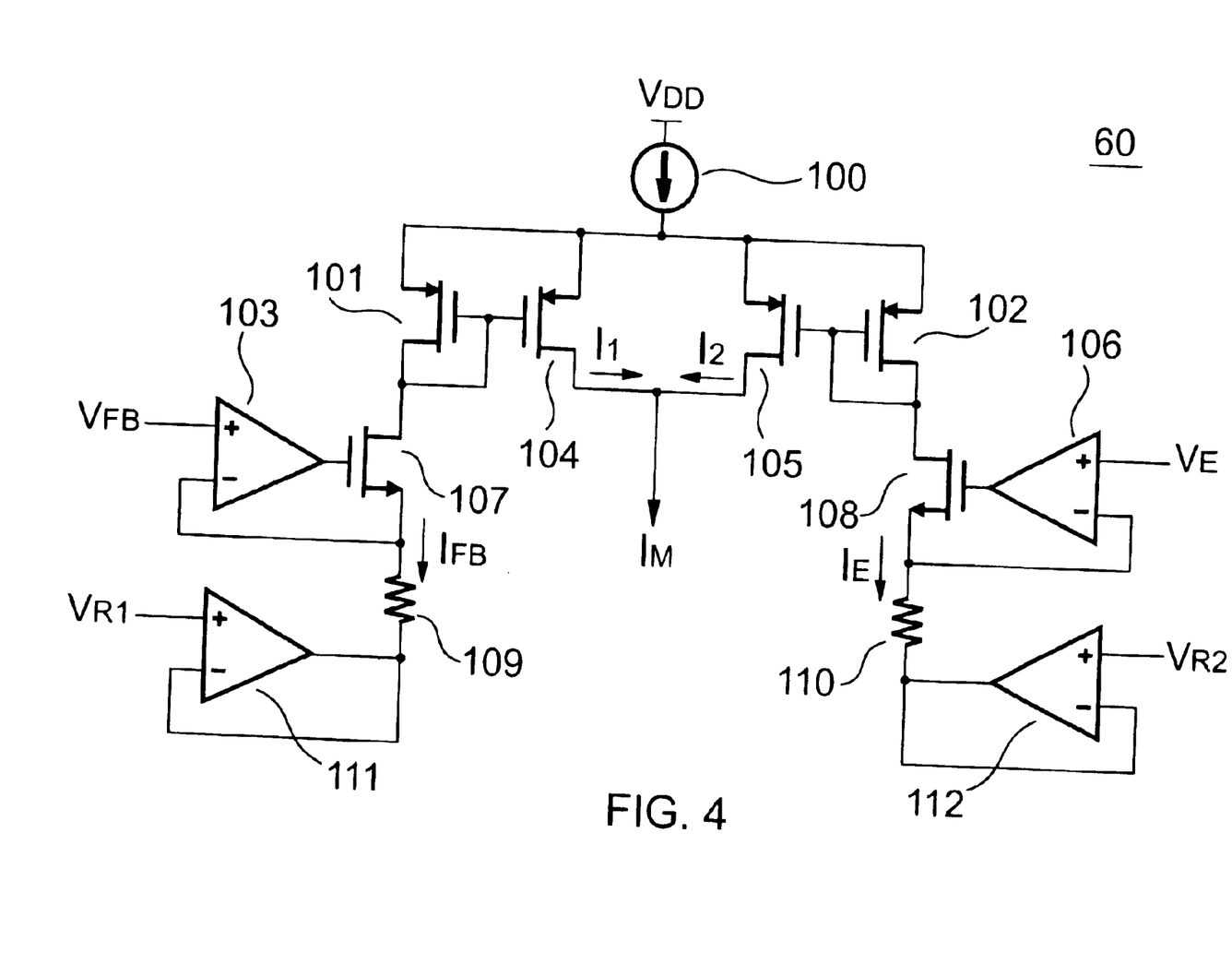
FIG. 4 shows an embodiment of a current synthesizer for power saving according to the present invention.

FIG. 4 shows a preferred embodiment of the current synthesizer 60 according to the present invention. The current synthesizer 60 comprises a current source 100, a first current mirror composed of a transistor 101 and a transistor 104, a second current mirror composed of a transistor 102 and a transistor 105, an operational amplifier 103, an operational amplifier 106, a buffer amplifier 111, a buffer amplifier 112, a V-to-I transistor 107, a V-to-I transistor 108, a resistor 109, and a resistor 110.

An input of the current source 100 is supplied by the supply voltage $V_{DD}$.

An output of the current source 100 is connected to a source of the transistor 101, a source of the transistor 102, a source of the transistor 104, and a source of the transistor 105. A gate of the transistor 101, a gate of the transistor 104, a drain of the transistor 101, and a drain of the V-to-I transistor 107 are tied together. A gate of the transistor 102, a gate of the transistor 105, a drain of the transistor 102, and a drain of the V-to-I transistor 108 are tied together. A gate of the V-to-I transistor 107 is driven by an output of the operational amplifier 103. A gate of the V-to-I transistor 108 is driven by an output of the operational amplifier 106.

The PWM-feedback voltage $V_{FB}$ is supplied to a positive input of the operational amplifier 103. The PFC-feedback voltage $V_E$ is supplied to a positive input of the operational amplifier 106. A negative input of the operational amplifier 103 is connected to a source of the V-to-I transistor 107. A negative input of the operational amplifier 106 is connected to a source of the V-to-I transistor 108.

A negative input of the buffer amplifier 111 is connected to an output of the buffer amplifier 111. A negative input of the buffer amplifier 112 is connected to an output of the buffer amplifier 112. A positive input of the buffer amplifier 111 and a positive input of the buffer amplifier 112 are supplied by the reference voltage $V_{R1}$, and the reference voltage $V_{R2}$ respectively. The resistor 109 is connected between the negative input of the operational amplifier 103 and the negative input of the buffer amplifier 111. The resistor 110 is connected between the negative input of the operational amplifier 106 and the negative input of the buffer amplifier 112. A drain of the transistor 104 and a drain of the transistor 105 are connected together to generate the bias current $I_M$.

Further referring to FIG. 4, under light-load conditions, both the PWM-feedback voltage $V_{FB}$ and the PFC-feedback voltage $V_E$ will be reduced. The current $I_{FB}$ flowing through the resistor 109 can be expressed by the following equation:

$$I_{FB} = \frac{V_{FB} - V_{R1}}{R_{109}} \quad (2)$$

where $R_{109}$ is the resistance of the resistor 109. The current $I_E$ flowing through the resistor 110 can be expressed by the following equation:

$$I_E = \frac{V_E - V_{R2}}{R_{110}} \quad (3)$$

where $R_{110}$ is the resistance of the resistor 110.

The first current mirror mirrors the current $I_{FB}$ to the current $I_1$. The second current mirror mirrors the current $I_E$ to the current $I_2$. The currents $I_1$ and $I_2$ are summed together to generate the bias current $I_M$. The bias current $I_M$ can be expressed by the following equation:

$$I_M = I_1 = N_1 \times I_{FB} \times N_2 \times I_E \quad (4)$$

where $N_1$ and $N_2$ are the mirror ratios of the first current mirror and the second mirror respectively. The bias current $I_M$ varies in response to the load conditions of the PFC circuit and PWM circuit. The bias current $I_M$ is supplied to the oscillator 61 to modulate the switching frequency.

Figure 5:
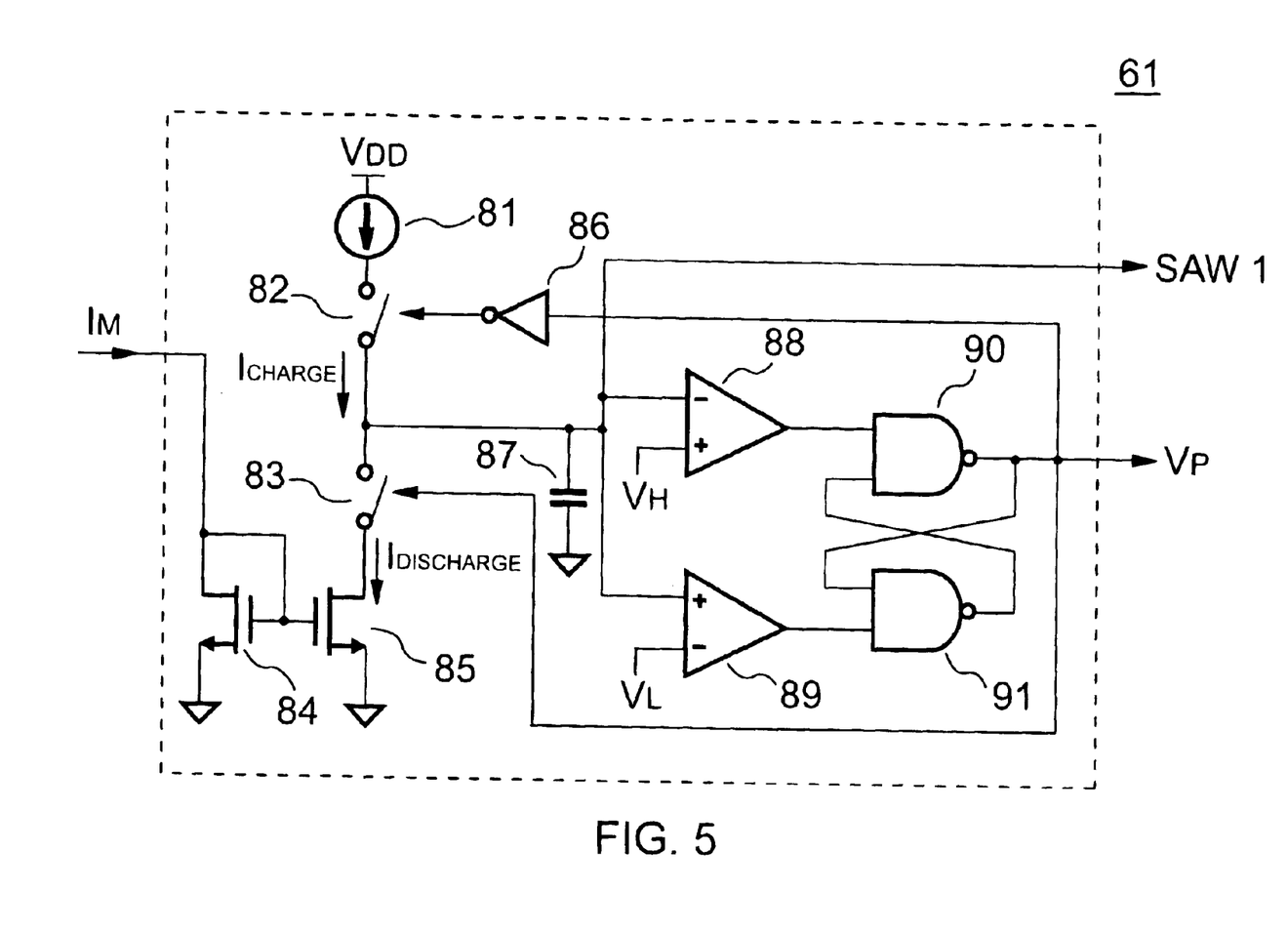
FIG. 5 shows an embodiment of an oscillator according to the present invention.

FIG. 5 shows a preferred embodiment of the oscillator 61 according to the present invention. The oscillator 61 comprises a third current mirror composed of a transistor 84 and a transistor 85, a switch 82, a switch 83, a capacitor 87, a comparator 88, a comparator 89, a NAND-gate 90, a NAND-gate 91, a NOT-gate 86, and a current source 81. An input of the current source 81 is supplied by the supply voltage $V_{DD}$. An output of the current source 81 is connected to an input terminal of the switch 82. An output terminal of the switch 82 and an input terminal of the switch 83 are tied together, and are connected to a negative input of the comparator 88 and a positive input of the comparator 89. A positive input of the comparator 88 is supplied by an upper-threshold voltage $V_H$. A negative input of the comparator 89 is supplied by a lower-threshold voltage $V_L$. An output of the comparator 88 is connected to a first input of the NAND-gate 90. An output of the comparator 89 is connected to a second input of the NAND-gate 91. An output of the NAND-gate 91 is connected to a second input of the NAND-gate 90. An output of the NAND-gate 90, which outputs the pulse signal $V_P$, is connected to a first input of the NAND-gate 91, an input of the NOT-gate 86, and a control terminal of the switch 83. An output of the NOT-gate 86 is connected to a control terminal of the switch 82.

The third current mirror formed by the transistors 84 and 85 mirrors the bias current $I_M$ to a discharge current $I_{DISCHARGE}$. A source of the transistor 84 and a source of the transistor 85 are connected to the ground reference. A gate of the transistor 84, a gate of the transistor 85, a drain of the transistor 84, and an output of the current synthesizer 60 shown in FIG. 2 are connected together. A drain of the transistor 85 is connected to an output terminal of the switch 83. The capacitor 87 is connected between the negative input of the comparator 88 and the ground reference.

Initially, the voltage of the capacitor 87 is zero. The comparator 88 will output a logic-high signal to the first input of the NAND-gate 90, and the comparator 89 will output a logic-low signal to the second input of the NAND-gate 91. Therefore, the output of the NAND-gate 90 will output a logic-low signal to the input of the NOT-gate 86 to turn on the switch 82. The current source 81 will then start to charge the capacitor 87. When the voltage of the capacitor 87 reaches the upper-threshold voltage $V_H$, the comparator 88 will output a logic-low signal to the first input of the NAND-gate 90. The NAND-gate 90 will output a logic-high signal to turn off the switch 82 and turn on the switch 83. At the moment the switch 83 is turned on, the discharge current $I_{DISCHARGE}$, which is varied in proportion to the bias current $I_M$, will start to discharge the capacitor 87. The discharge time of the capacitor 87 modulates the off-time of the pulse signal $V_P$. The discharge time of the capacitor 87 also determines the switching period of the PFC-PWM controller. Besides the pulse signal $V_P$, the oscillator 61 outputs the first saw-tooth signal SAW1 from the capacitor 87 for PWM control. The pulse signal $V_P$ provides a base frequency for easily synchronizing the PWM signal and the PFC signal.

Figure 6:
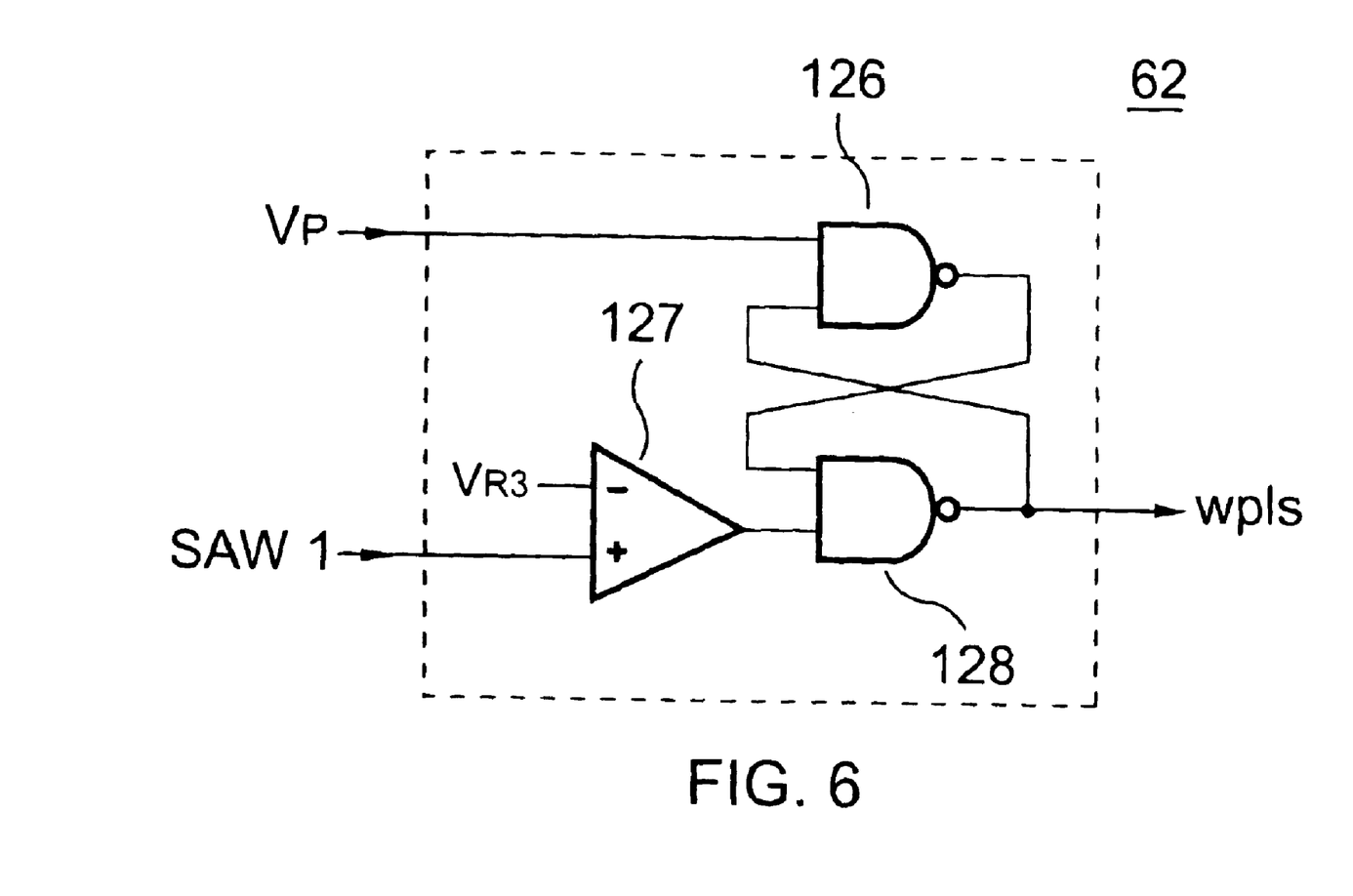
FIG. 6 shows an embodiment of a pulse-width limiter according to the present invention.

FIG. 6 shows a preferred embodiment of the pulse-width limiter 62 according to the present invention. The pulse-width limiter 62 comprises a NAND-gate 126, a NAND-gate 128, and a comparator 127. A reference voltage $V_{R3}$ is supplied to a negative input of the comparator 127. The first saw-tooth signal SAW1 is supplied to a positive input of the comparator 127. The pulse signal $V_P$ is supplied to a first input of the NAND-gate 126. An output of the NAND-gate 126 is connected to a first input of the NAND-gate 128. A second input of the NAND-gate 128 is connected to an output of the comparator 127. An output of the NAND-gate 128 is connected to a second input of the NAND-gate 126 and outputs the limit signal wpls. The magnitude of the reference voltage $V_{R3}$ determines a maximum on-time of the PWM signal. While the pulse signal $V_P$ is logic-low and the first saw-tooth signal SAW1 is less than the reference voltage $V_{R3}$, the NAND-gate 128 will output a logic-high limit signal. Once the first saw-tooth signal SAW1 reaches the reference voltage $V_{R3}$ the comparator 127 will output a logic-high signal, causing the limit signal wpls to become logic-low.

Figure 7:
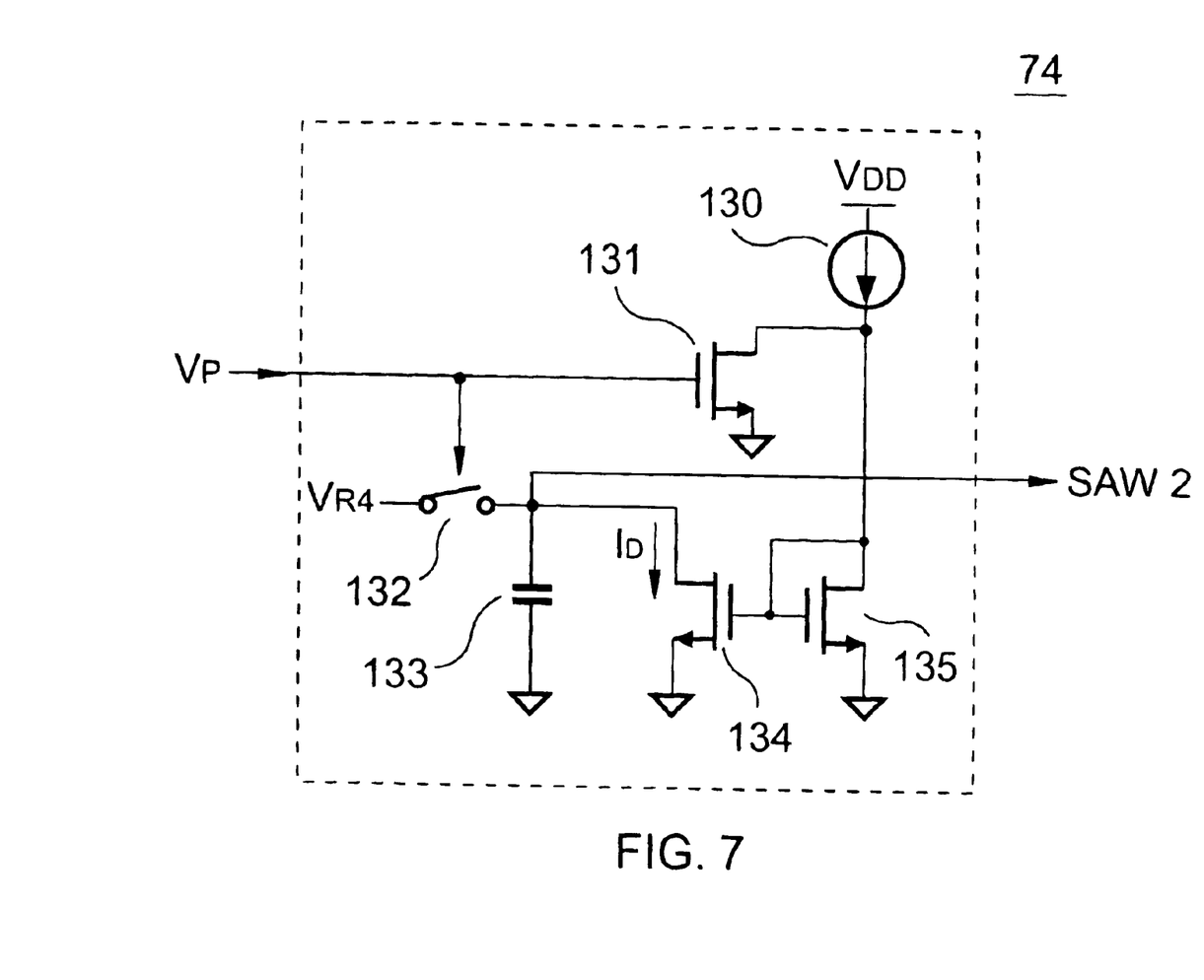
FIG. 7 shows an embodiment of a saw-wave generator according to the present invention.

FIG. 7 shows a preferred embodiment of the saw-wave generator 74. Similar to the way the first saw-tooth signal SAW1 controls the PWM signal, a second saw-tooth signal SAW2 is generated by the saw-wave generator 74 for PFC control. The saw-wave generator 74 comprises a transistor 131, a current source 130, a switch 132, a capacitor 133, and a fourth current mirror composed of a transistor 134 and a transistor 135.

A source of the transistor 131, a source of the transistor 134, and a source of the transistor 135 are connected to the ground reference. The pulse signal $V_P$ is provided to a gate of the transistor 131 and a control terminal of the switch 132. An input of the current source 130 is supplied by the supply voltage $V_{DD}$. An output of the current source 130 is connected to a drain of the transistor 131. A drain of the transistor 131, a drain of the transistor 135, a gate of the transistor 134, and a gate of the transistor 135 are tied together. An input terminal of the switch 132 is supplied by a reference voltage $V_{R4}$. An output terminal of the switch 132 is connected to a drain of the transistor 134. The capacitor 133 is connected between the drain of the transistor 134 and the ground reference.

While the pulse signal $V_P$ is logic-high, the switch 132 will be turned on and the reference voltage $V_{R4}$, will immediately charge the capacitor 133 to the voltage level of $V_{R4}$. Meanwhile, the current source 130 will be grounded and no current will flow into the drain of the transistor 135. Once the pulse signal $V_P$ drops to logic-low, the switch 132 is turned off and the energy stored in the capacitor 133 will be discharged by a discharge current $I_D$, which is mirrored from the current source 130. The capacitor 133 supplies the second saw-tooth signal $SAW_2$ for PFC control.

Figure 8:
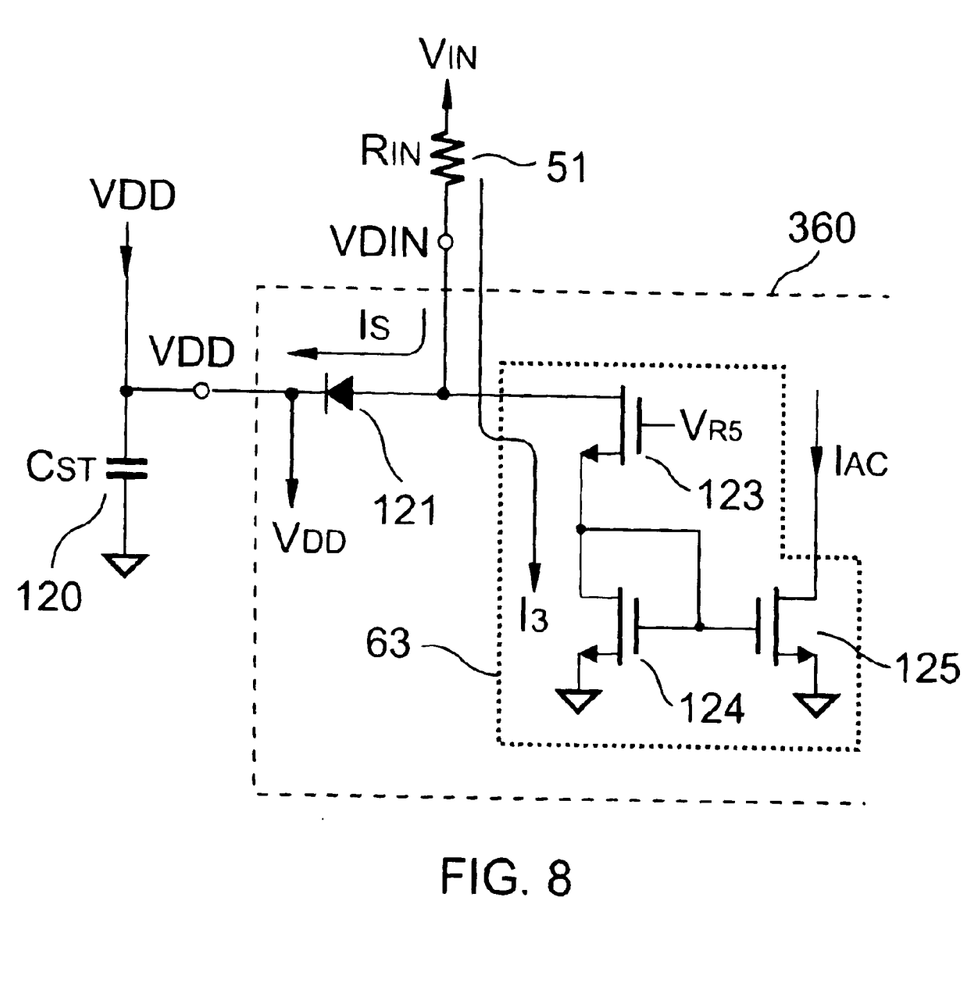
FIG. 8 shows an embodiment of a current reference generator according to the present invention.

FIG. 8 shows one embodiment of the present invention that uses the input resistor 51 to start up the PFC-PWM controller 360. This embodiment also uses the input resistor 51 to provide the AC template signal $I_{AC}$ for PFC control. The input resistor 51 is connected between the input voltage terminal VIN shown in FIG. 2 and the anode of the diode 121. The supply voltage $V_{DD}$ is supplied from a cathode of the diode 121, which is also connected to the auxiliary winding of the PFC transformer 16 via the rectifying diode 15. A start-up capacitor 120 is connected between the ground reference and the supply voltage terminal VDD of the PFC-PWM controller 360.

The current reference generator 63 comprises a transistor 123 and a fifth current mirror composed of a transistor 124 and a transistor 125. A drain of the transistor 123 is connected to the anode of the diode 121. A gate of the transistor 123 is supplied by a reference voltage $V_{R5}$. A source of the transistor 123, a drain of the transistor 124, a gate of the transistor 124, and a gate of the transistor 125 are tied together. A source of the transistor 124 and a source of the transistor 125 are connected to the ground reference.

Once the power converter is turned on, the input resistor 51 will convert the input voltage $V_{IN}$ to a start-up current $I_S$. The start-up current $I_S$ will then start to charge the start-up capacitor 120 via the diode 121. When the voltage of the start-up capacitor 120 reaches the start-up threshold voltage of the PFC-PWM controller 360, the reference voltage $V_{R5}$ will be initialized. The reference voltage V., will turn on the transistors 123, and the voltage at the anode of the diode 121 will drop to inverse-bias the diode 121. When the diode 121 is inverse-biased, the current path via the diode 121 will be cut off, and the supply voltage $V_{DD}$ will be supplied by the auxiliary winding of the PFC transformer 16 via the rectifying diode 0.15. Since the start-up current $I_S$ no longer flows through the diode 121, a third current $I_3$ will flow through the transistors 123 and 124. The transistor 125 will generate the AC template signal $I_{AC}$ in response to the third current $I_3$.

Figure 9:
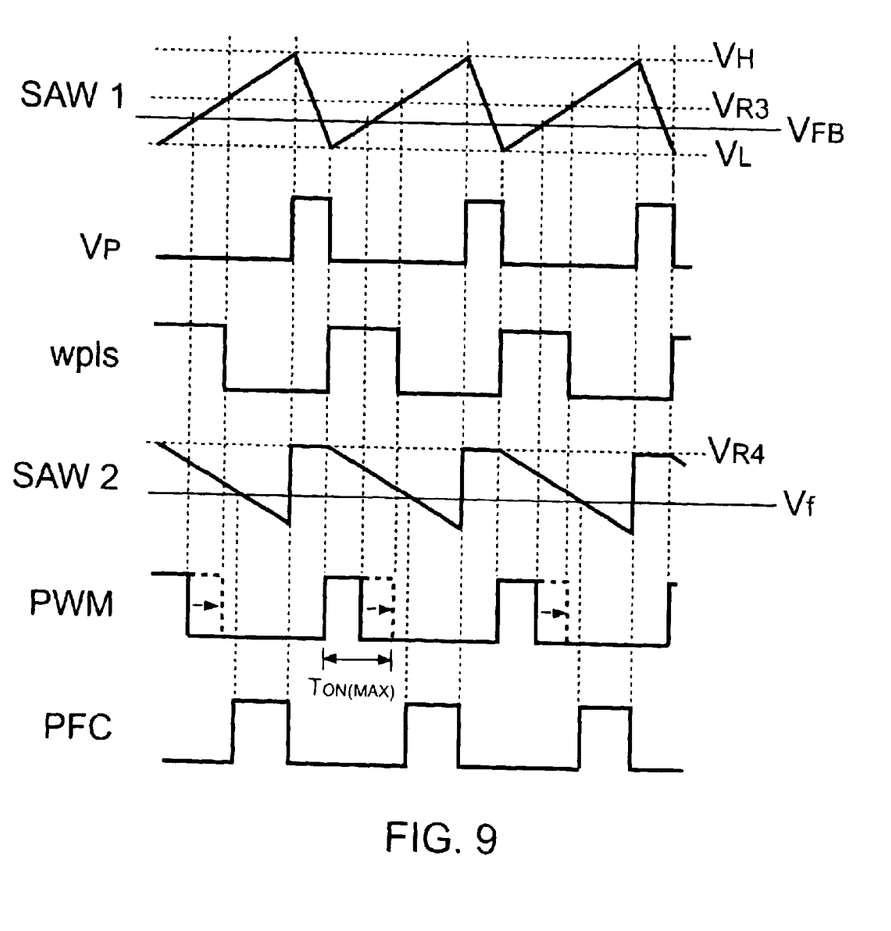
FIG. 9 shows a timing diagram observed during the operation of the PFC-PWM controller according to the present invention.

FIG. 9 shows the timing diagram of the PFC-PWM controller 360 according to the present invention. By properly setting the reference voltage $V_{R3}$ and the feedback voltage $V_f$, the PWM and the PFC signal can interleave each other. Since the PWM signal and the PFC signal are generated alternately, transmission efficiency is improved. Further, since the PWM signal and the PFC signal are synchronized by the pulse signal $V_P$, the off-times of the PWM signal and the PFC signal are extended under light-load and no-load conditions. The switching frequencies of the PWM signal and the PFC signal will then be reduced by expanding the switching period. Therefore, power consumption under light-load and no-load conditions can be greatly reduced by the PFC-PWM controller 360 according to the present invention.

It will be apparent to those skilled in the art that various modifications and variations can be made to the structure of the present invention without departing from the scope or spirit of the present invention. In view of the foregoing, it is intended that the present invention cover modifications and variations of this invention provided that they fall within the scope of the following claims and their equivalents.

What is claimed is:

1. A PFC-PWM controller having a power saving means comprising:

an input voltage terminal;

a PFC-feedback voltage terminal;

a PWM-feedback voltage terminal;

a first reference voltage terminal;

a second reference voltage terminal;

an input resistor;

a detection pin connected to said input resistor;

a current synthesizer for providing a bias current, wherein said current synthesizer has at least four inputs, wherein a first input is connected to said PWM-feedback voltage terminal, a second input is connected to said first reference voltage terminal, a third input is connected to said PFC-feedback voltage terminal, and a fourth input is connected to said second reference voltage terminal;

an oscillator having an input for receiving said bias current, a first output for generating a pulse signal, and a second output for generating a first saw-tooth signal;

a pulse-width limiter having a first input for receiving said pulse signal, a second input for receiving said first saw-tooth signal, and an output for generating a limit signal;

a saw-wave generator for generating a second saw-tooth signal; and a current reference generator having an input connected to the input voltage terminal via said input resistor and an output for generating a template signal.

2. The PFC-PWM controller as claimed in claim 1 further comprising:

an input RMS voltage terminal;

a current-sense terminal;

a NOT-gate for receiving the pulse signal;

a first SR flip-flop having a set-input connected to an output of said NOT-gate;

an AND-gate having a first input for receiving said limit signal, a second input for receiving an output of said first SR flip-flop, and an output for generating a PWM signal, wherein the maximum on-time of said PWM signal is determined by said limit signal;

a second SR flip-flop having a set-input for receiving said pulse signal;

a first comparator for PWM control having a positive input connected to the PWM-feedback voltage terminal, a negative input for receiving the first sawtooth signal, and an output for resetting said first SR flip-flop; and a multiplier/divider circuit having at least three inputs, wherein a first input is connected to said output of said current reference generator, a second input is connected to said input RMS voltage terminal, and a third input is connected to said PFC-feedback voltage terminal.

3. The PFC-PWM controller as claimed in claim 1 further comprising:

a buffer-gate for generating a PFC signal coupled to an output of a second SR flip-flop;

an error amplifier circuit for generating a feedback voltage having a first input connected to an output of the multiplier/divider circuit and a second input connected to a negative output of said bridge rectifier and an output;

a second comparator for PFC control having a negative input connected to an output of said saw-wave generator, a positive input for receiving said feedback voltage, and an output for setting said second SR flip-flop; and a start-up diode for starting up the PFC-PWM controller.

4. The PFC-PWM controller as claimed in claim 1, wherein said current synthesizer comprises:

a first V-to-I transistor for producing a PWM-feedback current;

a first operational amplifier for driving said first V-to-I transistor, wherein a positive input of said first operational amplifier is connected to said PWM-feedback voltage terminal;

a first buffer amplifier having a positive input connected to said first reference voltage terminal; and a first resistor, wherein said first resistor is connected between a negative input of said first operational amplifier and a negative input of said first buffer amplifier.

5. The PFC-PWM controller as claimed in claim 4, wherein said PWM-feedback current is generated by applying a first voltage across said first resistor, wherein the magnitude of said first voltage is equal to the magnitude of a first reference voltage subtracted from the magnitude of a PWM-feedback voltage.

6. The PFC-PWM controller as claimed in claim 4, wherein said current synthesizer further comprises:

a second V-to-I transistor for producing a PFC-feedback current;

a second operational amplifier for driving said second V-to-I transistor, wherein a positive input of said second operational amplifier is connected to said PFC-feedback voltage terminal;

a second buffer amplifier having a positive input connected to said second reference voltage terminal; and a second resistor, wherein said second resistor is connected between a negative input of said second operational amplifier and a negative input of said second buffer amplifier.

7. The PFC-PWM controller as claimed in claim 6, wherein said PFC-feedback current is generated by applying a second voltage across said second resistor, wherein the magnitude of said second voltage is equal to the magnitude of a second reference voltage subtracted from the magnitude of a PFC-feedback voltage.

8. The PFC-PWM controller as claimed in claim 4, wherein said current synthesizer further comprises:

a first current mirror for supplying a first mirror-current, wherein said first current mirror has a first input-transistor coupled with a first output-transistor;

a second current mirror for supplying a second mirror-current, wherein said second current mirror has a second input-transistor coupled with a second output-transistor; and a limit current source for clamping said bias current, wherein the amplitude of said bias current is equal to the sum of said first mirror-current and said second mirror-current.

9. The PFC-PWM controller as claimed in claim 1, wherein said oscillator comprises:

a first saw-tooth capacitor for generating said first saw-tooth signal;

a charge current source for providing a charge current;

a third current mirror for mirroring a first discharge current, wherein said third current mirror has a third input-transistor coupled with a third output-transistor, wherein a drain of said third input-transistor receives said bias current and a drain of said third output-transistor draws said first discharge current from said first saw-tooth capacitor;

an upper-threshold comparator for initiating the pulse signal;

a lower-threshold comparator for terminating the pulse signal;

a first NAND-gate, a second NAND-gate, wherein an output of said second NAND-gate is connected to an input of said first NAND-gate;

a first switch coupled to said first saw-tooth capacitor, wherein said first saw-tooth capacitor is charged by said charge current when said first switch is closed;

a second switch coupled to said first saw-tooth capacitor, wherein said first saw-tooth capacitor is discharged by said first discharge current when said second switch is closed, wherein said second switch is controlled by an output of said first NAND-gate; and a NOT-gate for controlling said first switch, wherein said NOT-gate has an input connected to said output of said first NAND-gate.

10. The PFC-PWM controller as claimed in claim 1, wherein said pulse-width limiter comprises:

a third comparator for controlling a pulse-width of said limit signal, wherein said third comparator has a positive input for receiving said first saw-tooth signal and a negative input connected to a third reference voltage terminal, wherein the pulse-width of said limit signal is determined by the magnitude of a third reference voltage;

a third NAND-gate having a first input for receiving said pulse signal; and a fourth NAND-gate having a first input connected to an output of said third NAND-gate, a second input connected to an output of said third comparator, and an output for supplying said limit signal.

11. The PFC-PWM controller as claimed in claim 1, wherein said saw-wave generator comprises:

a supply voltage terminal;

a second saw-tooth capacitor for generating said second saw-tooth signal;

a third switch having an input connected to a fourth reference voltage terminal, wherein said third switch has an output coupled to said second saw-tooth capacitor;

a first transistor having a gate driven by said pulse signal, wherein said first transistor has a source connected to the ground reference;

a discharge current source coupled between said supply voltage terminal and a drain of said first transistor; and a fourth current mirror for mirroring a second discharge current, wherein said fourth current mirror has a fourth input-transistor coupled with a fourth output-transistor, wherein said fourth current mirror receives a current from said discharge current source, wherein said fourth current mirror discharges said second saw-tooth capacitor.

12. The PFC-PWM controller as claimed in claim 1, wherein said current reference generator comprises:

a fifth reference voltage terminal;

a second transistor having a gate connected to said fifth reference voltage terminal, wherein said second transistor has a drain connected to said input voltage terminal via said input resistor; and a fifth current mirror having a fifth input-transistor coupling with a fifth output-transistor, wherein said fifth current mirror receives a current from a source of said second transistor, and wherein said fifth current mirror supplies said template signal.

* * * * *